(12) United States Patent
Xia et al.

(10) Patent No.: US 12,209,703 B2
(45) Date of Patent: Jan. 28, 2025

(54) FOLDABLE BRACKET

(71) Applicant: CraftGeek LLC, Irvine, CA (US)

(72) Inventors: Meihua Xia, Shenzhen (CN); Jun Lu, Shenzhen (CN)

(*) Notice: Subject to any disclaimer, the term of this patent is extended or adjusted under 35 U.S.C. 154(b) by 44 days.

(21) Appl. No.: 18/095,651

(22) Filed: Jan. 11, 2023

(65) Prior Publication Data

US 2024/0230022 A1    Jul. 11, 2024

(51) Int. Cl.
     *F16M 11/38*      (2006.01)
     *F16M 11/04*      (2006.01)
     *F16M 11/10*      (2006.01)

(52) U.S. Cl.
     CPC .......... *F16M 11/38* (2013.01); *F16M 11/041* (2013.01); *F16M 11/10* (2013.01)

(58) Field of Classification Search
     CPC ...... F16M 11/38; F16M 11/041; F16M 11/10; A47B 23/004
     USPC ....... 248/443, 444, 447, 448, 449, 454, 455, 248/457, 458, 460, 463
     See application file for complete search history.

(56) References Cited

U.S. PATENT DOCUMENTS

| | | | | |
|---|---|---|---|---|
| 7,530,543 | B1* | 5/2009 | Kremzar | A47B 97/02 248/188.7 |
| 7,543,790 | B2* | 6/2009 | Starcher | A47B 97/08 248/463 |
| 8,162,281 | B2* | 4/2012 | Logue | A47B 97/08 248/447 |
| 9,909,250 | B1* | 3/2018 | Greenspon | A47G 25/0685 |
| 2014/0252196 | A1* | 9/2014 | Abady | E05D 7/00 248/463 |
| 2023/0154444 | A1* | 5/2023 | Johnson | G10G 5/005 84/327 |

* cited by examiner

*Primary Examiner* — Alfred J Wujciak
(74) *Attorney, Agent, or Firm* — The Law Office of Austin Bonderer, PC; Austin Bonderer

(57) ABSTRACT

The foldable bracket includes a leg bracket assembly, a pulling-rod assembly, and a supporting assembly. The pulling-rod assembly has a pulling-rod assembly first end and a pulling-rod assembly second end that are opposite to each other. The leg bracket assembly is coupled to the pulling-rod assembly first end. The supporting assembly is foldably coupled to the pulling-rod assembly second end. The supporting assembly has an unfolded state and a retracted state. The supporting assembly includes at least a main bracket, a first connecting rod assembly, and a second connecting rod assembly. In the unfolded state, the first connecting rod assembly and the second connecting rod assembly are unfolded and form a supporting surface. In the retracted state, the first connecting rod assembly and the second connecting rod assembly are affixed with the main bracket, respectively, and form a rod-shaped structure.

12 Claims, 10 Drawing Sheets

FOLDABLE BRACKET

TECHNICAL FIELD

The utility model relates to the technical field of a sheet music bracket, and in particular to a foldable bracket.

BACKGROUND

A sheet music bracket of the prior art includes a leg, a telescopic rod, a sheet music placing plate, and other components. Generally, the leg and the telescopic rod are telescopic structures and can be stored. However, the sheet music placing plate cannot be completely folded and stored, and parts need to be disassembled. The sheet music placing plate takes up a large amount of space, which causes inconvenience to a manufacturer during packaging and transportation and is highly inconvenient for a user to carry.

SUMMARY

A main objective of the utility model is to provide a foldable bracket, which aims to be foldable and storable for easy carrying, use, packaging, and transfer, etc.

To achieve the above objective, the utility model proposes a foldable bracket, including:

a leg bracket assembly;

a pulling-rod assembly comprising a pulling-rod assembly first end and a pulling-rod assembly second end that are opposite to each other, the leg bracket assembly being coupled to the pulling-rod assembly first end; and a supporting assembly foldably coupled to the pulling-rod assembly second end, the supporting assembly configured to move between an unfolded state and a retracted state; the supporting assembly including at least a main bracket, a first connecting rod assembly, and a second connecting rod assembly, the main bracket being rotatably coupled to the pulling-rod assembly second end via a rotating shaft; the first connecting rod assembly being rotatably coupled to the main bracket; and the second connecting rod assembly being rotatably coupled to the main bracket;

in the unfolded state, the first connecting rod assembly and the second connecting rod assembly being unfolded and forming a supporting surface;

in the retracted state, the first connecting rod assembly and the second connecting rod assembly are affixed with the main bracket respectively and form a rod-shaped structure.

Optionally, the first connecting rod assembly is located on a main bracket top. The second connecting rod assembly is located at a main bracket middle. The supporting assembly further includes a third connecting rod assembly. The third connecting rod assembly is rotatably arranged at a main bracket bottom.

The first connecting rod assembly includes a first top rod and a second top rod. The first top rod and the second top rod are rotatably coupled to a main bracket top, respectively.

The second connecting rod assembly includes a first middle rod and a second middle rod. The first middle rod and the second middle rod are rotatably arranged in a main bracket middle, respectively.

The third connecting rod assembly includes a first bottom rod and a second bottom rod. The first bottom rod and the second bottom rod are rotatably arranged at the main bracket bottom, respectively.

In the unfolded state, the first top rod, the first middle rod, and the first bottom rod are located on the same side of the main bracket, respectively; the second top rod, the second middle rod, and the second bottom rod are located on the other side of the main bracket, respectively, to be unfolded to form the supporting surface.

In the retracted state, the first top rod, the second top rod, the first middle rod, the second middle rod, the first bottom rod, and the second bottom rod are affixed with the main bracket, respectively, to form a rod-shaped structure.

Optionally, the first middle rod and the second middle rod are tensile rods to adjust a length of the supporting surface to match different lengths of articles.

Optionally, the supporting assembly further includes a clamping assembly. The clamping assembly includes a first pressing member and a second pressing member for clamping edges of both sides of the article. The first pressing member is arranged at a first middle rod end. The second pressing member is arranged at a second middle rod end.

Optionally, the first pressing member and the second pressing member each include an upper housing, a lower housing, a pressing block, and a torsion spring. The upper housing is fixed with a tensile rod front surface. The upper housing is connected to the lower housing and fixed with tensile rod back surface. The upper housing is provided with two inserting holes for being inserted by two ends of a torsion shaft. The torsion spring is sleeved on the torsion shaft. Torsion spring first end abuts against the pressing block, and the torsion spring second end abuts against the upper housing. A pressing block end is connected to the upper housing via the torsion shaft. The pressing block is made of a transparent material.

Optionally, the main bracket is provided with a sliding groove along a length direction of the main bracket. First top rod end and a second top rod end are slidably arranged in the sliding groove via a sliding rotating mechanism to adjust a width of the supporting surface to match different widths of the articles.

Optionally, the sliding rotating mechanism includes a slider slidably arranged in the sliding groove, a first tooth block, a second tooth block, and a first fixing block. First tooth block first end is fixed with the first top rod, and the first tooth block second end is rotatably fixed between the slider and the first fixing block via a first rotating shaft. Second tooth block first end is fixed with the second top rod, and the second tooth block second end is rotatably fixed between the slider and the first fixing block via a second rotating shaft.

Optionally, the sliding rotating mechanism further includes two friction blocks. The slider includes a sliding upper housing and a sliding lower housing. The sliding upper housing and the sliding lower housing are surrounded and arranged to form a mounting cavity. The two friction blocks are arranged in the mounting cavity. Groove walls on both sides of the mounting cavity are provided with avoidance ports for outer ends of the two friction blocks to pass through, respectively. One end of the friction block and one end of the friction block are provided with an elastic member, and the other end of the friction block and the other end of the friction block abut against two walls of the sliding groove, respectively.

Optionally, the first bottom rod and the second bottom rod are both provided with a supporting plate for supporting a bottom of the article.

Optionally, a first bottom rod end and a second bottom rod end are coupled to the main bracket via a rotating assembly. The rotating assembly includes a supporting block, a third tooth block, a fourth tooth block, and a second fixing block that are coupled to the main bracket. Third tooth block first end is fixed with the first bottom rod, and the third tooth block second end is rotatably fixed between the supporting block and the second fixing block via a third rotating shaft. Fourth tooth block first end is fixed with the second bottom rod, and the fourth tooth block second end is rotatably fixed between the supporting block and the second fixing block via a fourth rotating shaft.

In the technical solution of the utility model, the foldable bracket includes the leg bracket assembly, the pulling-rod assembly, and the supporting assembly. The pulling-rod assembly comprises the pulling-rod assembly first end and the pulling-rod assembly second end that are opposite. The leg bracket assembly is coupled to the pulling-rod assembly first end. The supporting assembly is foldably coupled to the pulling-rod assembly second end. The supporting assembly has the unfolded state and the retracted state. The supporting assembly includes at least the main bracket, the first connecting rod assembly, and the second connecting rod assembly. The main bracket is rotatably provided on the pulling-rod assembly second end via the rotating shaft. The first connecting rod assembly is rotatably provided on the main bracket. The second connecting rod assembly is rotatably provided on the main bracket. In the unfolded state, the first connecting rod assembly and the second connecting rod assembly are unfolded and form the supporting surface. In the retracted state, the first connecting rod assembly and the second connecting rod assembly are affixed with the main bracket, respectively, and form a rod-shaped structure. Therefore, the utility model realizes foldable storage and unfolding and is convenient for a user to carry, easy to use, and also conducive to a manufacturer's packaging and transportation.

BRIEF DESCRIPTION OF THE DRAWINGS

In order to explain embodiments of the utility model or the technical solutions in the prior art more clearly, the following briefly introduces the drawings that need to be used in the description of the embodiments or the prior art. Obviously, the drawings in the following description are only some of the embodiments of the utility model. The person skilled in the art may obtain other drawings based on structures shown in these drawings without creative labor.

DESCRIPTION OF REFERENCE SIGNS

Figure 1:
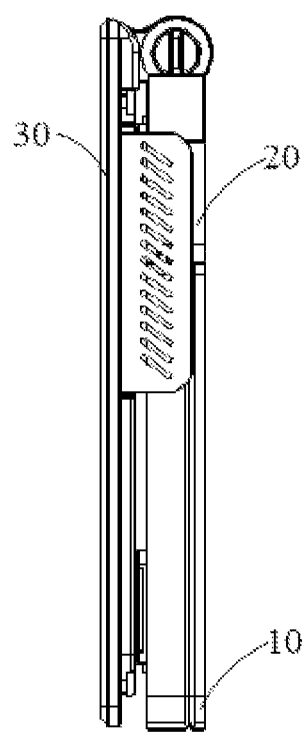
FIG. 1 is a schematic structural diagram of a supporting assembly in a retracted state in an embodiment of a foldable bracket of the utility model.

Leg bracket assembly 10; Pulling-rod assembly 20; Supporting assembly 30; Supporting surface 101; Main bracket 31; First connecting rod assembly 32; Second connecting rod assembly 33; Third connecting rod assembly 34; First top rod 321; Second top rod 322; First middle rod 331; Second middle rod 332; First bottom rod 341; Second bottom rod 342; Pressing assembly 40; Upper housing 411; Lower housing 412; Pressing block 413; Rotating shaft 311; Sliding groove 31a; Slider 51; First tooth block 52; Second tooth block 53; First fixing block 54; Friction block 55; Elastic member 56; Supporting plate 343; Supporting block 61; Third tooth block 62; Fourth tooth block 63; Second fixing block 64.

The realization, functional characteristics, and advantages of the objective of the utility model will be further described with reference to the drawings in conjunction with the embodiments.

DETAILED DESCRIPTION OF EMBODIMENTS

The following clearly and completely describes the technical solutions in embodiments of the utility model in conjunction with the drawings in the embodiments of the utility model. Obviously, the described embodiments are only a part of the embodiments of the utility model rather than all embodiments. Based on the embodiments of the utility model, all other embodiments obtained by the person skilled in the art without creative labor shall fall within the protection scope of the utility model.

It should be noted that if the embodiments of the utility model involve directional indications (such as up, down, left, right, front, back . . . ), the directional indications are only used to explain a relative position relationship and movement among various components under a certain posture (as shown in the accompanying drawings). If a specific posture changes, the directional indication also changes accordingly.

In addition, if there are descriptions of terms such as "first", "second" and the like in the embodiments of the utility model, the descriptions of the terms such as "first", "second" and the like are merely intended for the purpose of description, and shall not be understood as an indication or implication of relative importance or implicit indication of a quantity of indicated technical features. Therefore, the features defined with "first" and "second" may explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions between the various embodiments may be combined with each other, but should be based on what may be achieved by those skilled in the art. When a combination of technical solutions is contradictory or cannot be achieved, it should be considered that such a combination of technical solutions does not exist and does not fall within the scope of protection required by the utility model.

The utility model proposes a foldable bracket suitable for supporting articles such as a sheet music, a book, or a folder.

Figure 2:
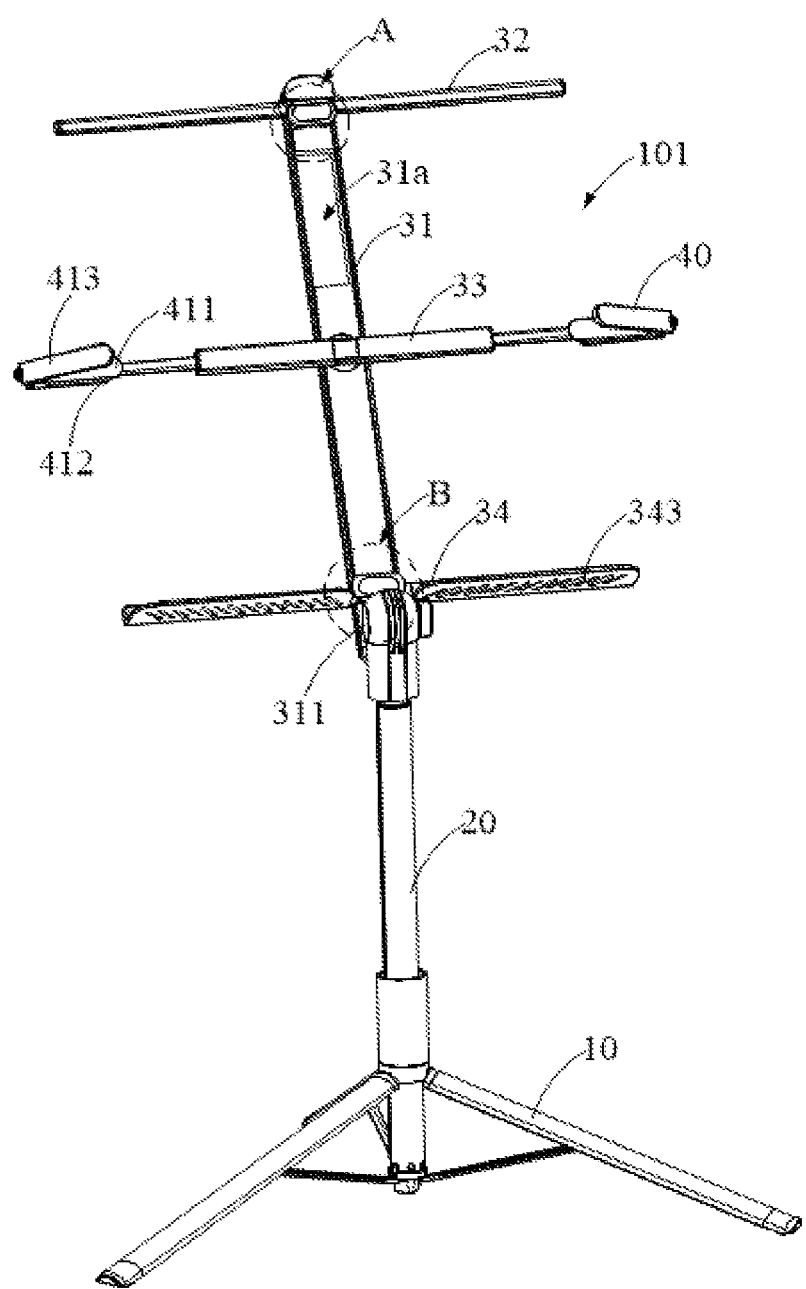
FIG. 2 is a schematic structural diagram of a supporting assembly in an unfolded state in an embodiment of a foldable bracket of the utility model.

Referring to FIGS. 1 and 2, in an embodiment of the utility model, the foldable bracket includes a leg bracket assembly 10, a pulling-rod assembly 20, and a supporting assembly 30. The pulling-rod assembly 20 comprises a pulling-rod assembly first end and a pulling-rod assembly second end that are opposite. The leg bracket assembly 10 is coupled to the pulling-rod assembly first end. The supporting assembly 30 is foldably coupled to the pulling-rod assembly second end. The supporting assembly 30 has an unfolded state and a retracted state. In the unfolded state, the supporting assembly 30 is opened and forms a supporting surface 101 for carrying an article, as shown in FIG. 2. In the retracted state, the supporting assembly 30 is closed together and forms a rod-shaped structure as a whole, as shown in FIG. 1.

In this embodiment, the leg bracket assembly 10 may be a tri-leg bracket, a multi-leg bracket, or the like, and is configured to support the pulling-rod assembly 20 and the supporting assembly 30 on the ground or a table surface. The leg bracket assembly 10 may be slidably sleeved at a pulling-rod assembly lower end.

The pulling-rod assembly 20 may include a plurality of tensile rods capable of adjusting a supporting height to ease user use.

The supporting assembly 30 may include a plurality of supporting rods or supporting plates so that the supporting assembly 30 may be switched between the unfolded state and the retracted state via a rotating mechanism, a sliding mechanism, a hinging mechanism, etc., which is not specifically defined here.

In this embodiment, the supporting assembly 30 may include a main bracket 31, a first connecting rod assembly 32, a second connecting rod assembly 33, and a third connecting rod assembly 34. It should be noted that in order to constitute the supporting surface 101 capable of supporting the articles such as the sheet music or the book, the supporting assembly 30 of the foldable bracket may include at least the two connecting rod assemblies, namely the first connecting rod assembly 32 and the second connecting rod assembly 33. Each of the connecting rod assemblies may be spaced and coupled to the main bracket 31. The number of the connecting rod assemblies is not defined here.

In this embodiment, the main bracket 31 is rotatably coupled to the pulling-rod assembly second end via a rotating shaft 311. The first connecting rod assembly 32 is rotatably coupled to a main bracket top. The second connecting rod assembly 33 is rotatably coupled to a main bracket middle. The third connecting rod assembly 34 is rotatably coupled to a main bracket bottom. In the unfolded state, the first connecting rod assembly 32, the second connecting rod assembly 33, and the third connecting rod assembly 34 are unfolded and form the supporting surface 101. In the retracted state, the first connecting rod assembly 32, the second connecting rod assembly 33, and the third connecting rod assembly 34 are affixed with the main bracket 31, respectively, and constitute a rod-shaped structure.

In the technical solution of the utility model, the foldable bracket includes the leg bracket assembly 10, the pulling-rod assembly 20, and the supporting assembly 30. The pulling-rod assembly 20 comprises a pulling-rod assembly first end and an opposite pulling-rod assembly second end. The leg bracket assembly 10 is coupled to the pulling-rod assembly first end. The supporting assembly 30 is foldably coupled to the pulling-rod assembly second end. The supporting assembly 30 has the unfolded state and the retracted state. In the unfolded state, the supporting assembly 30 is opened and forms a supporting surface 101 for carrying the article. In the retracted state, the supporting assembly 30 is closed together and forms a rod-shaped structure as a whole. Therefore, the utility model realizes foldable storage and unfolding and is convenient for a user to carry, easy to use, and also conducive to a manufacturer's packaging and transportation.

It should be noted that the supporting assembly 30 is foldably coupled to the pulling-rod assembly 20, after the supporting assembly 30 is closed together, as shown in FIG. 1. The supporting assembly 30 may be further folded and stored on a side of the pulling-rod assembly 20, thereby minimizing a length of the entire bracket after being stored.

In order to further improve convenience of storing and unfolding of the bracket and improve stability of the articles that the bracket supports, referring to FIGS. 2 to 10, in an embodiment, the first connecting rod assembly 32 includes a first top rod 321 and a second top rod 322. The first top rod 321 and the second top rod 322 are rotatably coupled to the main bracket top, respectively. The second connecting rod assembly 33 includes a first middle rod 331 and a second middle rod 332. The first middle rod 331 and the second middle rod 332 are rotatably arranged in the main bracket middle, respectively. The third connecting rod assembly 34 includes a first bottom rod 341 and a second bottom rod 342. The first bottom rod 341 and the second bottom rod 342 are rotatably arranged at the main bracket bottom, respectively.

Figure 10:
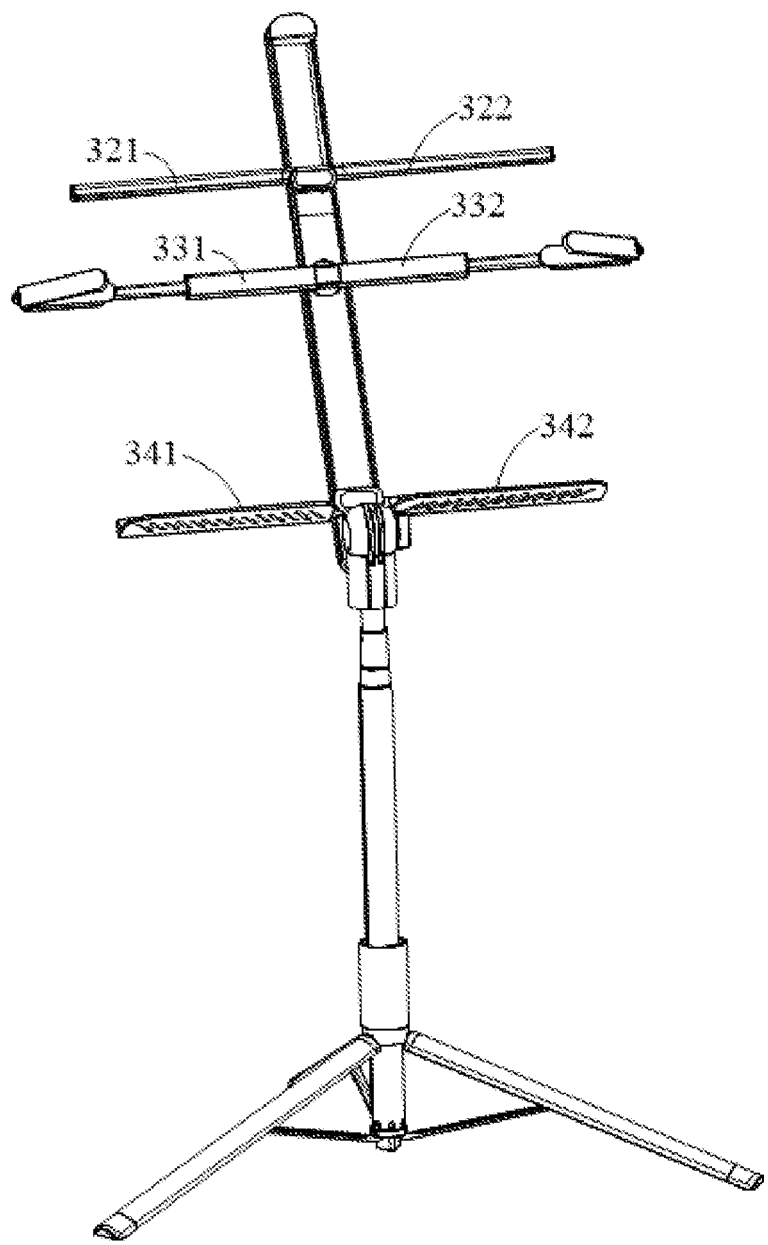
FIG. 10 is a schematic structural diagram of a supporting assembly in a fully unfolded state in an embodiment of a foldable bracket of the utility model.

Referring to FIG. 10, in the unfolded state, the first top rod 321, the first middle rod 331, and the first bottom rod 341 are located on the same side of the main bracket 31, respectively. The second top rod 322, the second middle rod 332, and the second bottom rod 342 are located on the other side of the main bracket 31, respectively, to be unfolded to form the supporting surface 101.

Figure 5:
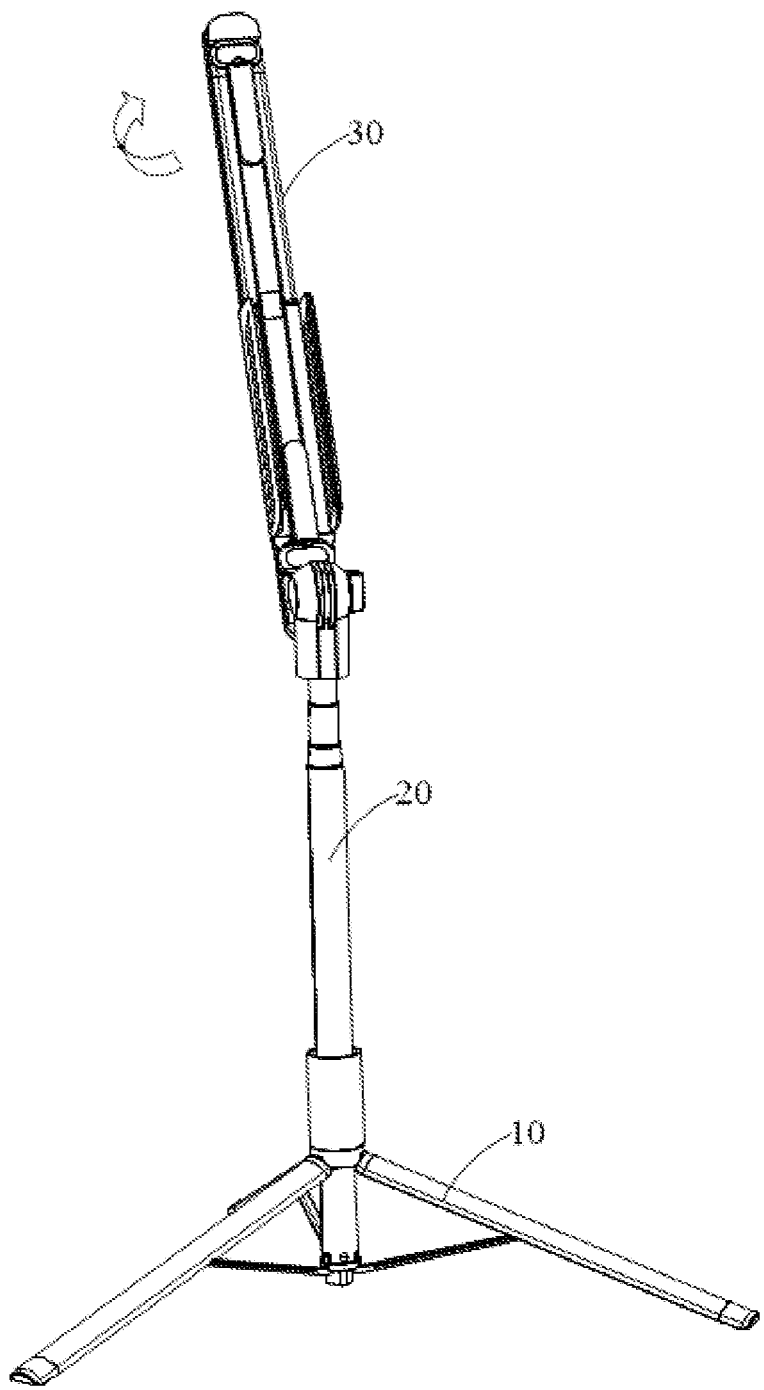
FIG. 5 is a schematic structural diagram of a supporting assembly during unfolding in an embodiment of a foldable bracket of the utility model.

Referring mainly to FIG. 5, in the retracted state, the first top rod 321, the second top rod 322, the first middle rod 331, the second middle rod 332, the first bottom rod 341 and the second bottom rod 342 are affixed with the main bracket 31, respectively, so that the supporting assembly 30 constitutes the rod-shaped structure.

Figure 8:
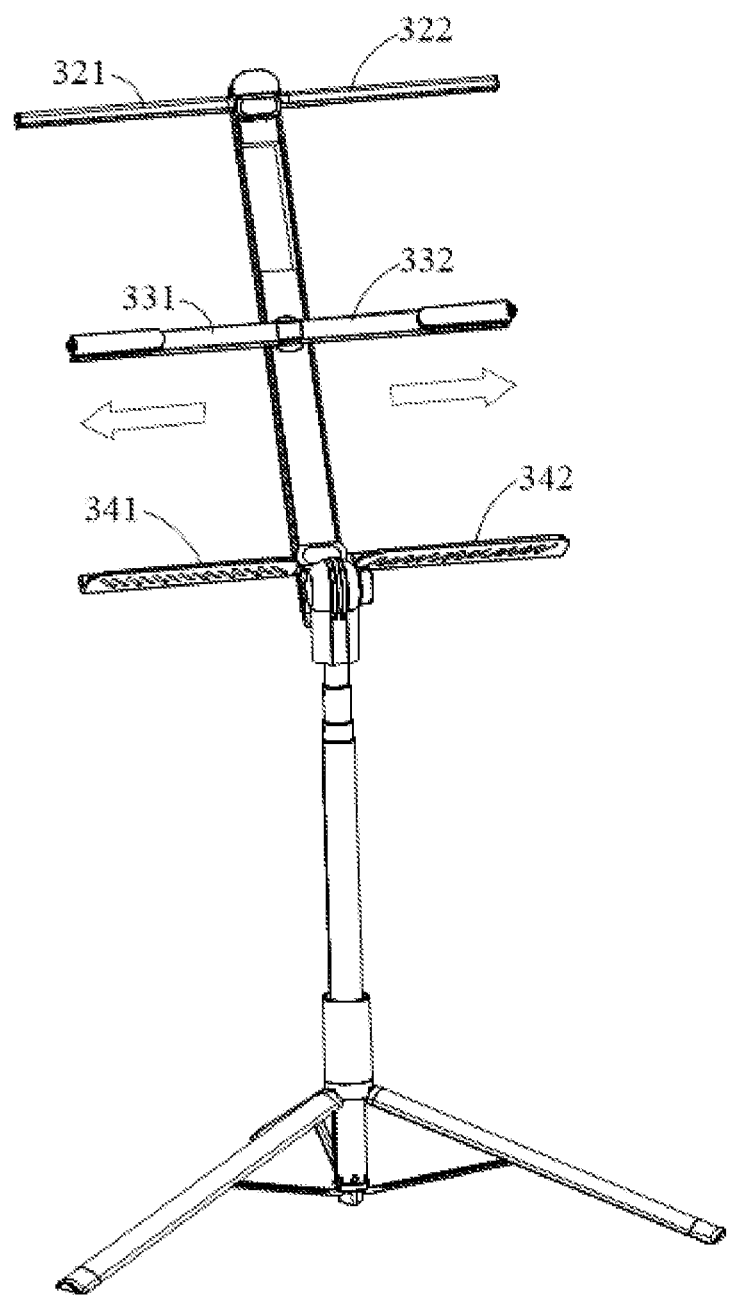
FIG. 8 is a schematic structural diagram of a supporting assembly during unfolding in an embodiment of a foldable bracket of the utility model.

Referring mainly to FIG. 8, in this embodiment, both the first middle rod 331 and the second middle rod 332 may be the tensile rods to adjust a length of the supporting surface 101 to match different lengths of the articles, which can meet support needs of more specifications of the articles such as the sheet music, the book, or the folder, and improve applicability of the foldable bracket.

As shown in FIG. 2, in one embodiment, the supporting assembly 30 further includes a clamping assembly. The clamping assembly includes a first pressing member and a second pressing member for clamping edges of both sides of the article. The first pressing member is arranged at a first middle rod end. The second pressing member is arranged at a second middle rod end.

In this embodiment, the first pressing member and the second pressing member each include an upper housing 411, a lower housing 412, a pressing block 413, and a torsion spring. The upper housing 411 is fixed with a tensile rod front surface. The upper housing 411 is connected to the lower housing 412 and fixed with tensile rod back surface. The upper housing 411 is provided with two inserting holes for being inserted by two ends of a torsion shaft. The torsion spring is sleeved on the torsion shaft. Torsion spring first end abuts against the pressing block 413, and the torsion spring second end abuts against the upper housing 411. A pressing block end is connected to the upper housing 411 via the torsion shaft. In this way, stability of the foldable bracket for supporting the article may be further enhanced, and the article can be effectively prevented from being slipped down.

In this embodiment, the pressing block 413 may be made of a transparent material such as acrylic so that a word or a picture and other contents concealed under the clamping assembly may be effectively viewed via the clamping assembly when edges of the articles such as the sheet music or the book are clamped, which greatly improves the user's experience.

Figure 3:
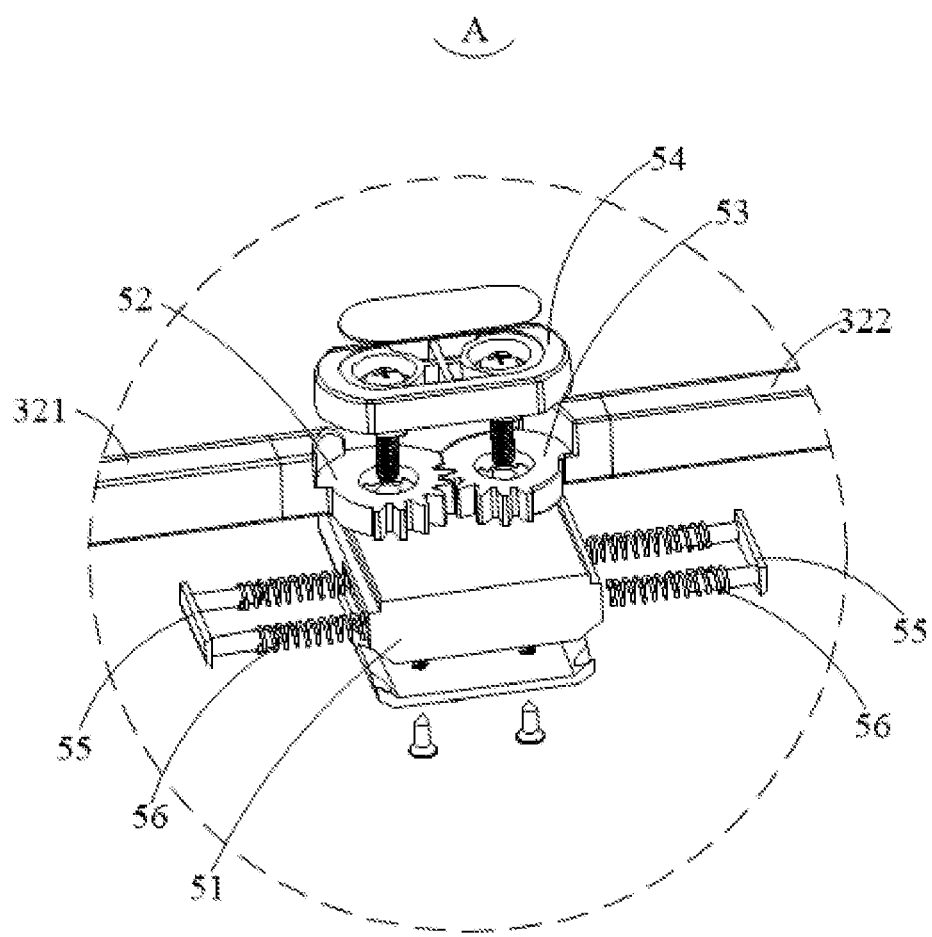
FIG. 3 is an enlarged diagram of area A in FIG. 2.

In order to further enhance the applicability of the foldable bracket to fit more specifications of the articles, referring to FIGS. 2 and 3, in an embodiment, the main bracket 31 is provided with a sliding groove 31a along a length direction of the main bracket 31. First top rod end and a second top rod end are slidably arranged in the sliding groove 31a via a sliding rotating mechanism to adjust a width of the supporting surface 101 to match different widths of the articles.

Referring mainly to FIG. 3, in this embodiment, the sliding rotating mechanism may include a slider 51 slidably arranged within the sliding groove 31a, a first tooth block 52, and a second tooth block 53, and a first fixing block 54. First tooth block first end is fixed with the first top rod 321, and the first tooth block second end is rotatably fixed between the slider 51 and the first fixing block 54 via a first rotating shaft. Second tooth block first end is fixed with the second top rod 322, and the second tooth block second end is rotatably fixed between the slider 51 and the first fixing block 54 via a second rotating shaft. Therefore, the applicability of the bracket is enhanced while the first connecting rod assembly 32 may be folded, stored and unfolded.

Figure 6:
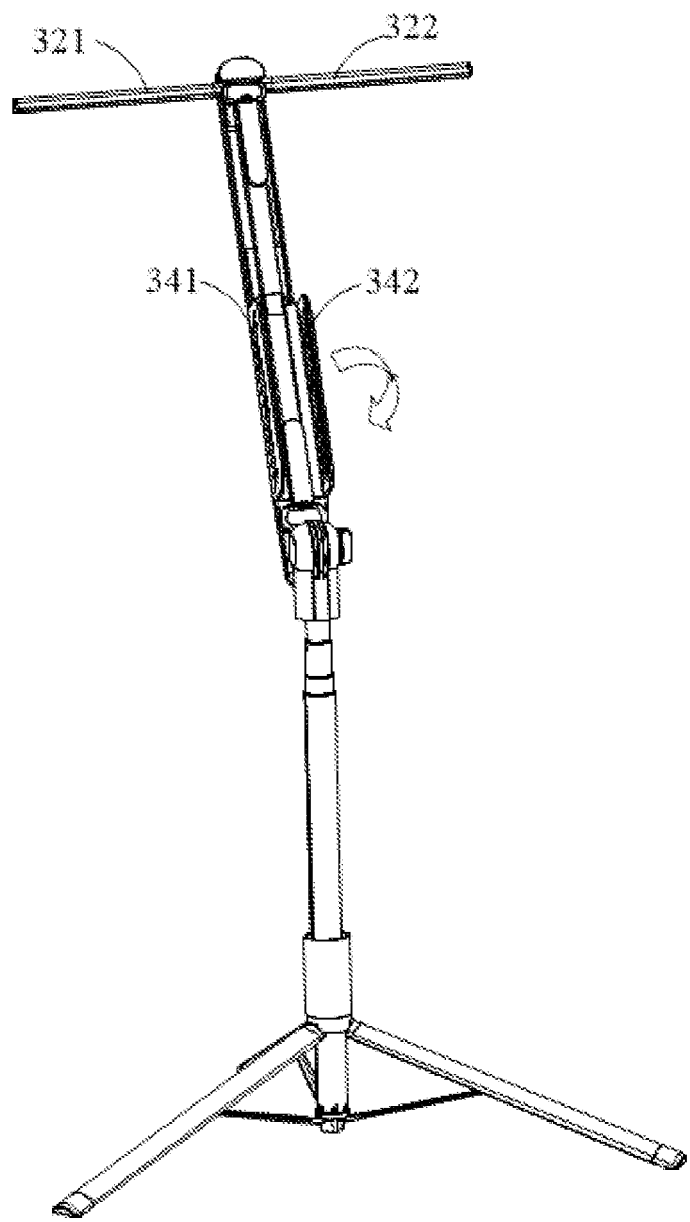
FIG. 6 is a schematic structural diagram of a supporting assembly during unfolding in an embodiment of a foldable bracket of the utility model.
Figure 7:
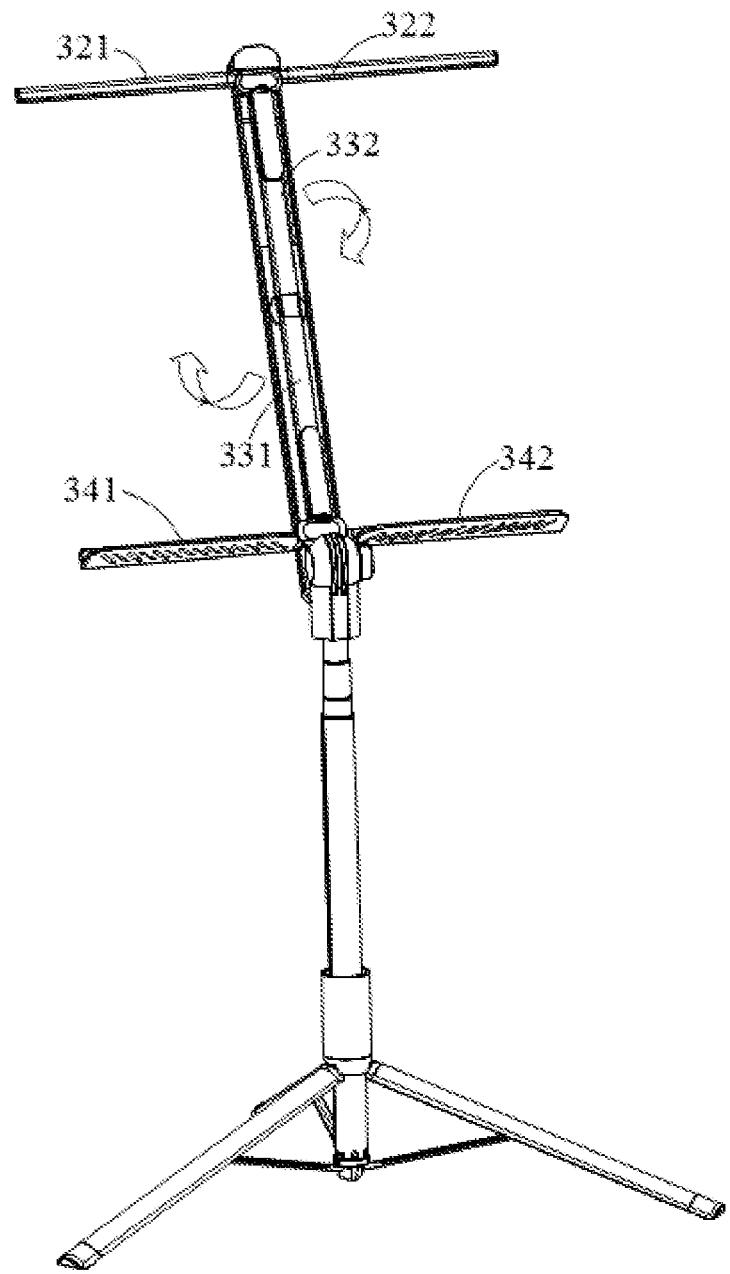
FIG. 7 is a schematic structural diagram of a supporting assembly during unfolding in an embodiment of a foldable bracket of the utility model.
Figure 9:
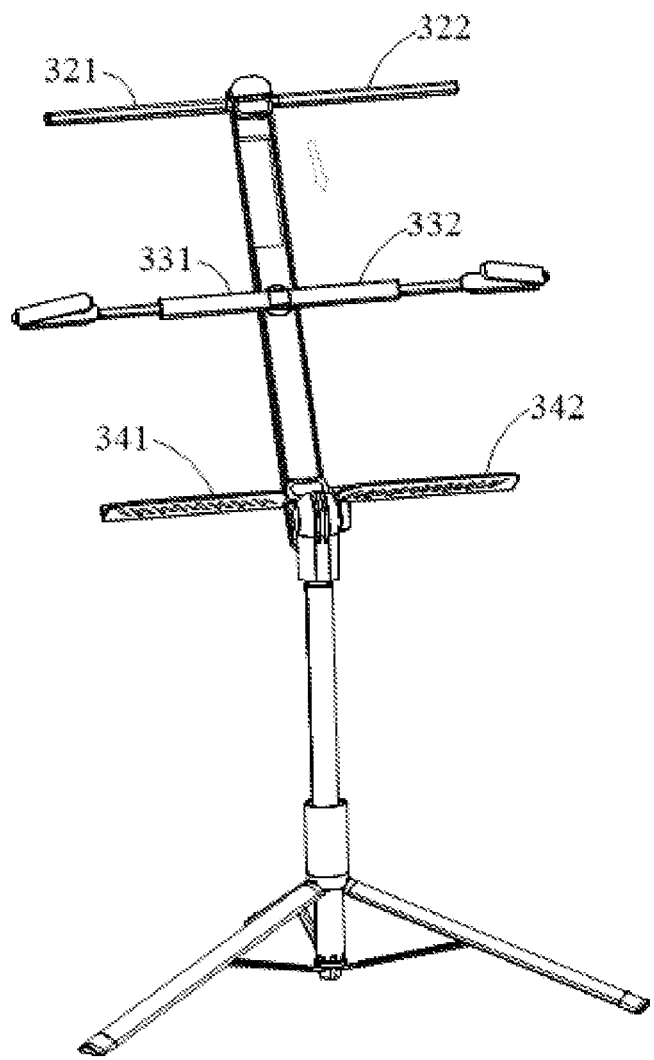
FIG. 9 is a schematic structural diagram of a supporting assembly during unfolding in an embodiment of a foldable bracket of the utility model.

In use, in conjunction with FIGS. 1 and 5, the supporting assembly 30 may be opened by being rotated upward, and the leg bracket assembly 10 is opened by being slid downward. The leg bracket assembly 10 is placed on the ground. Referring to FIGS. 5 and 6, the first top rod 321 and the second top rod 322 are rotatably opened. Referring to FIGS. 6 and 7, the first bottom rod 341 and the second bottom rod 342 are rotatably opened. Referring to FIGS. 7 and 8, the first middle rod 331 and the second middle rod 332 are rotatably opened. Referring to FIGS. 8 and 9, a length of the first middle rod 331 and a length of the second middle rod 332 are further extended according to a length of the article, to adjust the length of the supporting surface 101. Referring to FIGS. 9 and 10, the first top rod 321 and the second top rod 322 are further slid according to a width of the article to adjust the width of the supporting surface 101. Finally, the sheet music and other articles are placed on the supporting surface 101. Two sides of the article can be clamped by the first pressing member and the second pressing member, respectively.

Referring to FIG. 3, in an embodiment, the sliding rotating mechanism further comprises two friction blocks 55. The slider 51 includes a sliding upper housing and a sliding lower housing. The sliding upper housing and the sliding lower housing are surrounded and arranged to form a mounting cavity. The two friction blocks 55 are arranged in the mounting cavity. Groove walls on both sides of the mounting cavity are provided with avoidance ports for outer ends of the two friction blocks 55 to pass through, respectively. Each friction block 55 engages the elastic members 56, and the other end of each the friction block 55 abut against the wall of a sliding groove 31a. The elastic members 56 bias the friction blocks 55 into frictional engagement with the sliding grooves 31a.

It may be understood that the friction block 55 elastically abuts against the walls of the sliding groove 31a, which may protect the slider 51 and prevent the slider 51 from being worn with the walls of the sliding groove 31a during sliding, improve a service life of the slider 51, and may satisfy smoothness of the slider 51 sliding within the sliding groove 31a.

Referring to FIG. 2, in an embodiment, both the first bottom rod 341 and the second bottom rod 342 are provided with a supporting plate 343 for supporting the bottom of the article to further enhance the stability of the foldable bracket for supporting the article.

Figure 4:
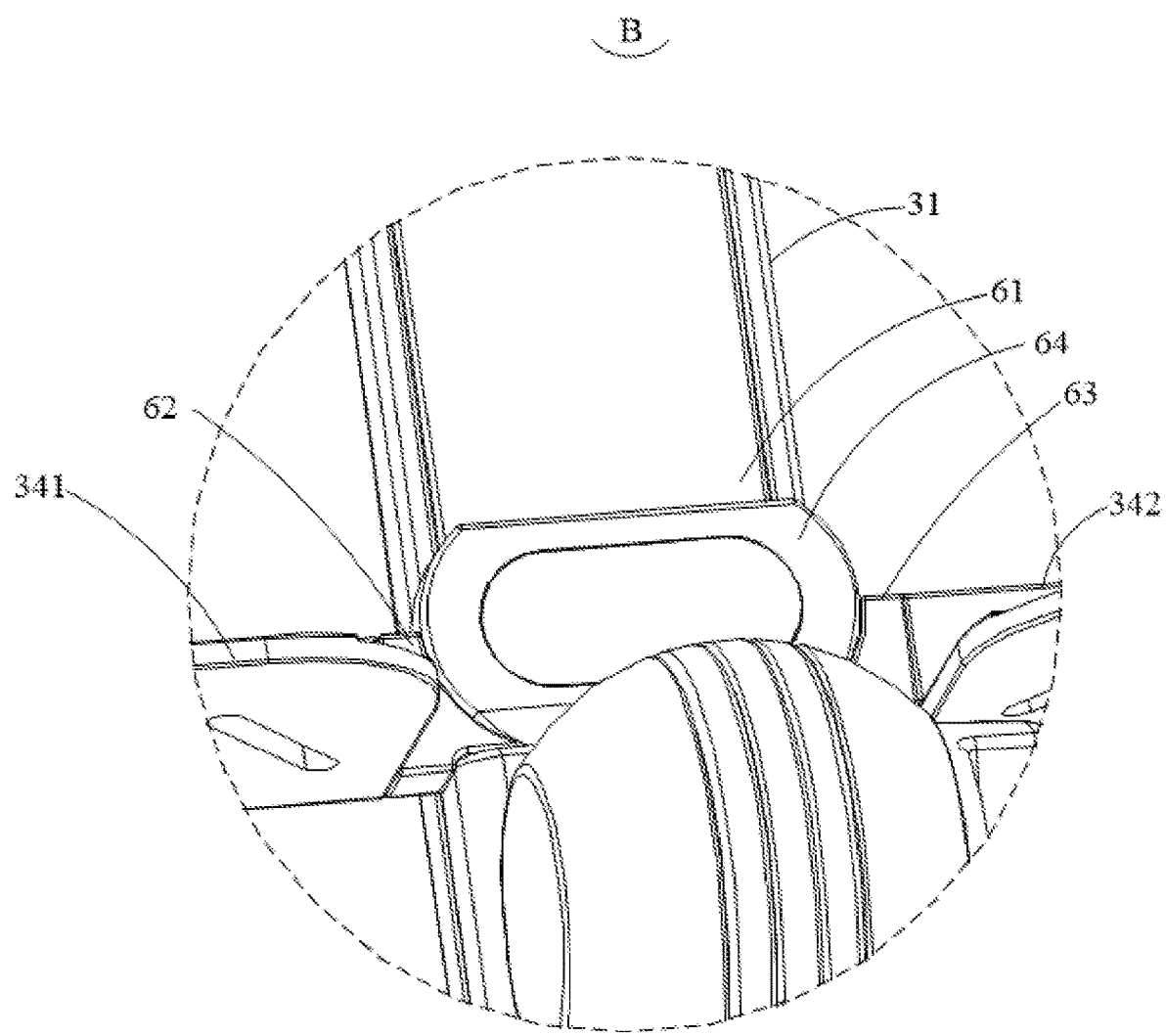
FIG. 4 is an enlarged diagram of area B in FIG. 2.

In order to achieve the storing and unfolding functions of the third connecting rod assembly 34, referring to FIGS. 2 and 4, in an embodiment, a first bottom rod end and a second bottom rod end are coupled to the main bracket 31 via a rotating assembly. The rotating assembly includes a supporting block 61, a third tooth block 62, a fourth tooth block 63, and a second fixing block 64 that are coupled to the main bracket 31. Third tooth block first end is fixed with the first bottom rod 341, and the third tooth block second end is rotatably fixed between the supporting block 61 and the second fixing block 64 via a third rotating shaft. Fourth tooth block first end is fixed with the second bottom rod 342, and the fourth tooth block second end is rotatably fixed between the supporting block 61 and the second fixing block 64 via a fourth rotating shaft.

Similarly, in this embodiment, the second connecting rod assembly 33 may adopt a connecting structure similar to the rotating assembly connected to the third connecting rod assembly 34 to achieve rotational unfolding and storage, which is not specifically defined here.

Referring to FIG. 10, when the supporting assembly 30 is in the unfolded state, centerlines of the first top rod 321 and the second top rod 322 may be on the same line and may be perpendicular or slightly inclined to a centerline of the main bracket 31. Centerlines of the first middle rod 331 and the second middle rod 332 may be on the same line and may be perpendicular or slightly inclined to the centerline of the main bracket 31. Centerlines of the first bottom rod 341 and the second bottom rod 342 may be on the same line and may be perpendicular or slightly inclined to the centerline of the main bracket 31.

Referring to FIG. 5, when the supporting assembly 30 is in the retracted state, the first top rod 321 and the second top rod 322 coincide with or are parallel to the centerline of the main bracket 31. The first middle rod 331 and the second middle rod 332 coincide with or are parallel to the centerline of the main bracket 31. The first bottom rod 341 and the second bottom rod 342 are perpendicular or slightly inclined to the centerline of the main bracket 31.

The forgoing is only a preferred embodiment of the utility model and is not intended to limit the patent scope of the utility model. Under the inventive concept of the utility model, an equivalent structure variation made by the contents of the description and drawings of the utility model directly/indirectly applied to other related arts is included in the scope of patent protection of the utility model.

What is claimed is:
1. A foldable stand, comprising:
   a leg bracket assembly;
   a pulling-rod assembly comprising a pulling-rod assembly first end and a pulling-rod assembly second end that are opposite to each other, and the leg bracket assembly being coupled to the pulling-rod assembly first end; and
   a supporting assembly foldably coupled to the pulling-rod assembly second end, and the supporting assembly is configured to move between an unfolded state and a retracted state; wherein the supporting assembly comprises at least a main bracket, a first connecting rod assembly, and a second connecting rod assembly; the main bracket being rotatably coupled to the pulling-rod assembly second end via a rotating shaft; the first connecting rod assembly being rotatably coupled to the main bracket; and the second connecting rod assembly being rotatably coupled to the main bracket about a center of the second connecting rod assembly;

wherein in the unfolded state, the first connecting rod assembly and the second connecting rod assembly being unfolded and forming a supporting surface; and in the retracted state, the first connecting rod assembly and the second connecting rod assembly are affixed with the main bracket, and the first connecting rod assembly, the second connecting rod assembly, and the main bracket define a rod-shaped structure.

2. The foldable stand according to claim 1, wherein the first connecting rod assembly is located on a main bracket top, and the second connecting rod assembly is located at a main bracket middle; the supporting assembly further comprises a third connecting rod assembly, and the third connecting rod assembly is rotatably arranged at a main bracket bottom;

the first connecting rod assembly comprises a first top rod and a second top rod, the first top rod and the second top rod are both rotatably coupled to the main bracket top;

the second connecting rod assembly comprises a first middle rod and a second middle rod, and the first middle rod and the second middle rod are rotatably arranged in the main bracket middle;

the third connecting rod assembly comprises a first bottom rod and a second bottom rod, and the first bottom rod and the second bottom rod are both rotatably arranged at the main bracket bottom;

in the unfolded state, the first top rod, the first middle rod, and the first bottom rod are located on the same side of the main bracket; and the second top rod, the second middle rod, and the second bottom rod are located on the other side of the main bracket; and in the retracted state, the first top rod, the second top rod, the first middle rod, the second middle rod, the first bottom rod, and the second bottom rod are affixed with the main bracket, respectively, to form a second rod-shaped structure.

3. The foldable stand according to claim 2, wherein the first middle rod and the second middle rod are tensile rods configured to adjust a length of the supporting surface to match different lengths of articles.

4. The foldable stand according to claim 3, wherein the supporting assembly further comprises a clamping assembly, the clamping assembly comprises a first pressing member and a second pressing member configured to clamp edges of both sides of an article, the first pressing member is coupled to a first middle rod end, and the second pressing member is coupled to a second middle rod end.

5. The foldable stand according to claim 4, wherein the first pressing member and the second pressing member each comprise an upper housing, a lower housing, a pressing block, and a torsion spring; the upper housing is coupled to a tensile rod front surface, the upper housing is connected to the lower housing and coupled to a tensile rod back surface, the upper housing is provided with two inserting holes for being inserted by two ends of a torsion shaft, the torsion spring is sleeved on the torsion shaft, a torsion spring first end abuts against the pressing block, and a torsion spring second end abuts against the upper housing, and an pressing block end is connected to the upper housing via the torsion shaft; and the pressing block is made of a transparent material.

6. The foldable stand according to claim 2, wherein the main bracket is provided with a sliding groove along a length direction of the main bracket, and a first top rod end and a second top rod end are slidably arranged in the sliding groove via a sliding rotating mechanism to adjust a width of the supporting surface to match different widths of articles.

7. The foldable stand according to claim 6, wherein the sliding rotating mechanism comprises a slider slidably arranged in the sliding groove, a first tooth block, a second tooth block, and a first fixing block; a first tooth block first end is fixed with the first top rod, and a first tooth block second end is rotatably fixed between the slider and the first fixing block via a first rotating shaft; and a second tooth block first end is fixed with the second top rod, and a second tooth block second end is rotatably fixed between the slider and the first fixing block via a second rotating shaft.

8. The foldable stand according to claim 7, wherein the sliding rotating mechanism further comprises two friction blocks, the slider comprises a sliding upper housing and a sliding lower housing; the sliding upper housing and the sliding lower housing are surrounded and arranged to form a mounting cavity; the two friction blocks are arranged in the mounting cavity, groove walls on both sides of the mounting cavity are provided with avoidance ports for outer ends of the two friction blocks to pass through; and the two friction blocks are biased by an elastic member against walls of the sliding groove.

9. The foldable stand according to claim 2, wherein the first bottom rod and the second bottom rod are both provided with a supporting plate for supporting a bottom of an article.

10. The foldable stand according to claim 2, wherein a first bottom rod end and a second bottom rod end are coupled to the main bracket via a rotating assembly; and the rotating assembly comprises:
a supporting block;
a third tooth block;
a fourth tooth block and a second fixing block that are coupled to the main bracket;
wherein a third tooth block first end is coupled to the first bottom rod, and a third tooth block second end is rotatably coupled between the supporting block and the second fixing block via a third rotating shaft; and a fourth tooth block first end is coupled to the second bottom rod, and a fourth tooth block second end is rotatably fixed between the supporting block and the second fixing block via a fourth rotating shaft.

11. A foldable stand, comprising:
a leg bracket assembly;
a pulling-rod assembly comprising a pulling-rod assembly first end and a pulling-rod assembly second end that are opposite to each other, and the leg bracket assembly being coupled to the pulling-rod assembly first end; and
a supporting assembly foldably coupled to the pulling-rod assembly second end, and the supporting assembly is configured to move between an unfolded state and a retracted state;
wherein the supporting assembly comprises at least a main bracket, a first connecting rod assembly, and a second connecting rod assembly; the main bracket being rotatably coupled to the pulling-rod assembly second end via a rotating shaft; the first connecting rod assembly being rotatably coupled to the main bracket; and the second connecting rod assembly is coupled to the main bracket about a center of the second connecting rod assembly;

wherein in the unfolded state, the first connecting rod assembly and the second connecting rod assembly being unfolded and forming a supporting surface; and in the retracted state, the first connecting rod assembly and the second connecting rod assembly are affixed with the main bracket, and the first connecting rod assembly, the second connecting rod assembly, and the main bracket define a rod-shaped structure.

12. A foldable stand, comprising:

a leg bracket assembly;

a pulling-rod assembly comprising a pulling-rod assembly first end and a pulling-rod assembly second end that are opposite to each other, and the leg bracket assembly being coupled to the pulling-rod assembly first end; and a supporting assembly foldably coupled to the pulling-rod assembly second end, and the supporting assembly is configured to move between an unfolded state and a retracted state; wherein the supporting assembly comprises at least a main bracket, a first connecting rod assembly, and a second connecting rod assembly; the main bracket being rotatably coupled to the pulling-rod assembly second end via a rotating shaft; the first connecting rod assembly being rotatably coupled to the main bracket; and the second connecting rod assembly is configured to rotate about a center of the second connecting rod assembly;

wherein in the unfolded state, the first connecting rod assembly and the second connecting rod assembly being unfolded and forming a supporting surface; and in the retracted state, the first connecting rod assembly and the second connecting rod assembly are affixed with the main bracket, and the first connecting rod assembly, the second connecting rod assembly, and the main bracket define a rod-shaped structure.

* * * * *